US009457270B2

(12) United States Patent
Fiedler

(10) Patent No.: US 9,457,270 B2
(45) Date of Patent: Oct. 4, 2016

(54) LEVEL SERVER SYSTEM FOR PEER-TO-PEER COOPERATIVE GAMES

(75) Inventor: Glenn Fiedler, Santa Monica, CA (US)
(73) Assignee: SONY INTERACTIVE ENTERTAINMENT AMERICA LLC, San Mateo, CA (US)
( * ) Notice: Subject to any disclaimer, the term of this patent is extended or adjusted under 35 U.S.C. 154(b) by 978 days.

(21) Appl. No.: 12/614,977

(22) Filed: Nov. 9, 2009

(65) Prior Publication Data

US 2011/0111859 A1    May 12, 2011

(51) Int. Cl.
| | |
|---|---|
| A63F 13/35 | (2014.01) |
| A63F 13/34 | (2014.01) |
| A63F 13/837 | (2014.01) |
| A63F 13/40 | (2014.01) |
| A63F 13/30 | (2014.01) |
| H04L 29/08 | (2006.01) |
| H04L 29/06 | (2006.01) |

(52) U.S. Cl.
CPC .............. *A63F 13/34* (2014.09); *A63F 13/10* (2013.01); *A63F 13/12* (2013.01); *A63F 13/837* (2014.09); *H04L 67/104* (2013.01); *H04L 67/38* (2013.01); *A63F 2300/402* (2013.01); *A63F 2300/5533* (2013.01)

(58) Field of Classification Search
CPC ................................ A63F 13/10; A63F 13/12
USPC .............................. 463/1–6, 40–42; 709/223
See application file for complete search history.

(56) References Cited

U.S. PATENT DOCUMENTS

| | | | |
|---|---|---|---|
| 6,561,901 | B1 | 5/2003 | Takase |
| 7,167,182 | B2 | 1/2007 | Butler |
| 2002/0086735 | A1* | 7/2002 | Hamagaki ....................... 463/43 |
| 2003/0177187 | A1 | 9/2003 | Levine et al. |
| 2003/0217135 | A1 | 11/2003 | Chantani et al. |
| 2004/0221010 | A1 | 11/2004 | Butler |
| 2010/0234111 | A1 | 9/2010 | Li et al. |

FOREIGN PATENT DOCUMENTS

| | | |
|---|---|---|
| CN | 1205483 A | 1/1999 |
| CN | 1592899 A | 3/2005 |
| CN | 101217534 A | 7/2008 |
| CN | 102763097 A | 10/2012 |
| EP | 1 506 491 B1 | 2/2005 |
| WO | 2011/056264 | 5/2011 |

OTHER PUBLICATIONS

Yu et al "MOPAR: A Mobile Peer-to-Peer Overlay Architecture for Interest Management of Massively Multiplayer Online Games" Jun. 14, 2005.*
Knutsson et al. Peer-to-Peer Support for Massively Multiplayer Games. IEEE2004.*
International Search Report mailed on Aug. 30, 2010, for International Application No. PCT/US2010/038296 filed on Jun. 11, 2010, 2 pages.
Jiang et al., "Flood Trail: an Efficient File Search Technique in Unstructured Peer-to-Peer Systems," Globecom 2003, Department of Computer Science, College of William and Mary, Williamsburg, VA, vol. 7, pp. 2891-2895, 2003.

* cited by examiner

*Primary Examiner* — Ronald Laneau
*Assistant Examiner* — Ross Williams
(74) *Attorney, Agent, or Firm* — Kilpatrick Townsend & Stockton LLP

(57) ABSTRACT

Methods and systems are described for a multiplayer video game on a peer-to-peer network in which players' game consoles can pass off or accept server or other management responsibilities for individual rooms, levels, or other virtual areas from other game consoles. Each player's game console can be either a 'level server' or a 'level client,' the level server's responsibilities including spawning and directing non-player characters, tracking objects, and/or conducting other management responsibilities of the room for the level clients. The level server can send updates such as save game states and other level checkpoints to its level clients for the specific virtual area that it manages.

18 Claims, 14 Drawing Sheets

DATA TABLE MANAGER

|  | P1 | P2 | P3 | P4 |
|---|---|---|---|---|
| Level A | ⋮ | ⋮ | ⋮ | ⋮ |
| Level B | ⋮ | ⋮ | ⋮ | ⋮ |
| Level C | 2 | 1 | 1 | — |
|  | ⋮ | ⋮ | ⋮ | ⋮ |

WRITTEN WHEN P1 UNLOADS LEVEL C

OTHER PLAYERS MUST NOW SYNCHRONIZE

FIG. 11

LEVEL TOKEN TABLE

|  | CURRENT OWNER | ACQUIRE (LEVEL LOADED) | | | |
|---|---|---|---|---|---|
|  |  | P1 | P2 | P3 | P4 |
| Level A | P1 |  | ✓ |  |  |
| Level B | P1 | ✓ |  |  |  |
| Level C | P3 | ✓ | ✓ | ✓ |  |
| Level D | P4 |  |  |  | ✓ |
| ⋮ | ⋮ |  | ⋮ |  |  |

FIG. 12

LEVEL SERVER SYSTEM FOR PEER-TO-PEER COOPERATIVE GAMES

CROSS-REFERENCES TO RELATED APPLICATIONS

NOT APPLICABLE

BACKGROUND

1. Field of the Invention

This application relates generally to the field of video game amusement devices including means for processing data in a networked environment. Specifically presented are methods and systems for managing a multiplayer video game on peer-to-peer network connected video game consoles.

2. Description of the Related Art

Many computer video games are programmed to be able to be played with one or more players on a single video game console. In some video games, multiple players can connect multiple consoles together through a phone, cable, or other network. Connecting multiple game consoles together can allow the processing power of each game console, which sometimes houses an extraordinarily powerful central microprocessor, graphics rendering and audio processors, and fast memory, to service the processing needs of each player local to the game console while tying game play of all the consoles into one combined game. For enhanced realism and smooth game play, it is often critical for these networked game consoles to work near the envelope of their processing and memory limits.

There are two common types of network architecture for routing packets and other communication signals among networked game consoles: client-server and peer-to-peer.

FIG. 1 illustrates a "client-server" network architecture. Communications go between each client and the server, but generally not between clients. In one type of client-server architecture, the client computers are often disparate models (e.g. various personal computers or game consoles) to one another that communicate to a central server or set of servers over a wide area network, such as the Internet. In a video game, the central server tracks the location of each player, non-player character, and various items and objects in the video game.

In another type of client-server architecture, the client computers are the same model or relatively similar types (e.g. game consoles) in which one of the clients acts as a server. The server can be selected in an ad hoc fashion between the various connected consoles, and is typically the host player's console, which is the console of the first player to begin the game.

FIG. 2 illustrates a "peer-to-peer" network architecture. Communications typically go between each and every peer. Similar or disparate types of computers can be connected with one another in a peer-to-peer topology. In a video game, the peers pass messages and other communications with one another to duplicate the locations of players, non-player characters, objects, and other settings in each peer.

Multiplayer games can pit different players directly against each other, such as in a shoot-to-kill game. Multiplayer games can also have players cooperate to achieve a desired goal in the game. Cooperative games can involve players in the same platoon in a war simulation, on the same quest in an adventure series, or pursue other exciting missions.

In designing video games, converting a single player game to a multiplayer cooperative game can be difficult because the single player content, such as levels and missions, are typically budgeted for a single player on a console. That is, one player moving around in each room of the world takes up almost all the entire central processing unit (CPU), memory, and streaming budget. To preserve memory, each room is loaded from memory as the player enters it, and the room just left is unloaded. The room and all its features fill the memory of the console.

In a multiplayer game, multiple players can conceivably explore different rooms or levels at the same time. The tight budgeting for the consoles has been worked around by shipping multiplayer cooperative games with a separate set of CO-OP missions with lesser detail than would be available in a non-CO-OP game. Unfortunately, less detail is undesirable, especially when users are accustomed to a high level of detail in the avatars, non-player characters, interactive objects, background, and other visual and audio items in the video game environment from playing the single-player version. Another workaround for multiplayer games is the use of tethering players.

FIGS. 3A and 3B illustrate "tethering" of two players. In an illustrative game with three rooms, A, B, and C, players P1 and P2 are tethered to one another. A solid line around room A denotes that it is loaded in memory, while dashed lines around rooms B and C indicate that they are not loaded. Players P1 and P2 are limited to being within the same room. This limitation is expressed when player P1 stays in room A and player P2 attempts to move from room A to room B (see FIG. 3B). Player P2 is halted from proceeding further until his compatriot follows him.

Tethering the players together preserves memory by forcing the players to move together into each room, so that only one room needs to be loaded and serviced at a time. Thus, the memory and processor budget for the multiplayer game does not significantly exceed that of the single player version of the game.

Tethering players has disadvantages in that one player might want to depart from the confines of the room in which the other player is playing. Thus, solutions for untethering players in a multiplayer game are sought while not requiring an expensive, centralized server for a client-server architecture.

Embodiments of the invention address these and other problems.

BRIEF SUMMARY

Embodiments in accordance with the present disclosure relate to multiplayer video games which can pass off or accept server or other management responsibilities for individual rooms, levels, or other virtual areas from one peer-to-peer networked game console to another. The management responsibilities include keeping track of the "state" of a room, for example, including the location, velocity, etc. of players, non-player characters, movable parts of the room (e.g. door open or closed), switches, props, and other items as well as spawning and directing non-player characters and performing game artificial intelligence (AI) functions. When a player using the console moves to a different room, server responsibilities can be passed off to another player's console whose avatar remains in the room. The other player's console then assumes management of the state of the room, spawning enemies, and performing other game artificial intelligence (AI) duties.

An embodiment in accordance with the present disclosure relates to a method of managing a multiplayer video game on machines connected in a peer-to-peer network architecture. The method includes managing on a first game machine a virtual area in a video game, the managing including tracking a location of each movable object in the virtual area for the first game machine and a second game machine, the game machines operatively connected in a peer-to-peer network architecture. The second game machine does not manage the virtual area while the first game machine manages the virtual area. The method further includes transferring management of the virtual area from the first game machine to the second game machine.

The method can further include a request for management by the first game machine of the virtual area after transferring management of the virtual area from the first game machine to the second game machine, and a receipt by the first game machine of a denial of the request to manage the virtual area based on the second game machine already managing the virtual area.

Another embodiment in accordance with the present disclosure relates to a method of managing a multiplayer video game on machines connected in a peer-to-peer network architecture. The method includes managing on a first game machine a first virtual area in a video game, moving a first player from the first virtual area to a second virtual area, the second virtual area managed by a second game machine operatively coupled to the first game machine in a peer-to-peer network architecture, and updating on the first game machine a state of the second virtual area in response to a game checkpoint received from the second game machine. Managing a virtual area includes tracking a location of each movable object in the respective virtual area.

In another embodiment, multiple peer-to-peer networked peers are connected to execute a game, where each of the peers is capable of acting as a level server for a virtual area of the game. At most only one level server can manage any area, and each peer can only manage up to a maximum of two areas. The peers are enabled to hand off level server responsibilities or other management of a virtual area to another of the peers in response to a user-controllable element (e.g. a player's avatar) leaving the virtual area.

Other embodiments relate to machine-readable tangible storage media and computer systems which employ or store instructions for the methods described above.

A further understanding of the nature and the advantages of the embodiments disclosed and suggested herein may be realized by reference to the remaining portions of the specification and the attached drawings.

BRIEF DESCRIPTION OF THE DRAWINGS

FIG. 11 is a data table manager in accordance with an embodiment.

FIG. 12 is a level token table in accordance with an embodiment.

Figure 1:
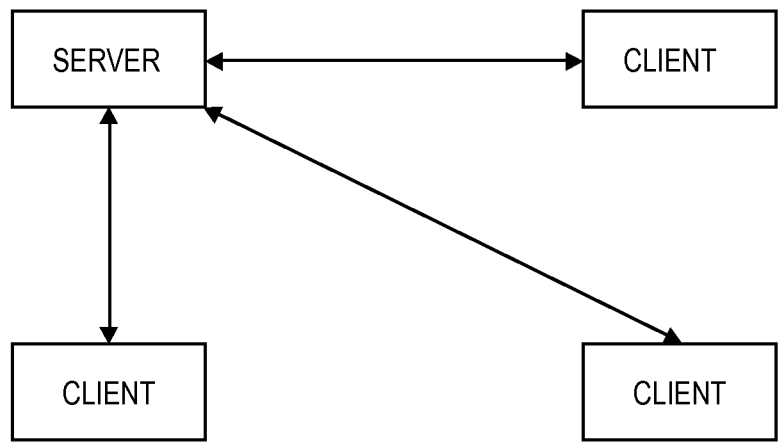
FIG. 1 illustrates a client-server network architecture.
Figure 2:
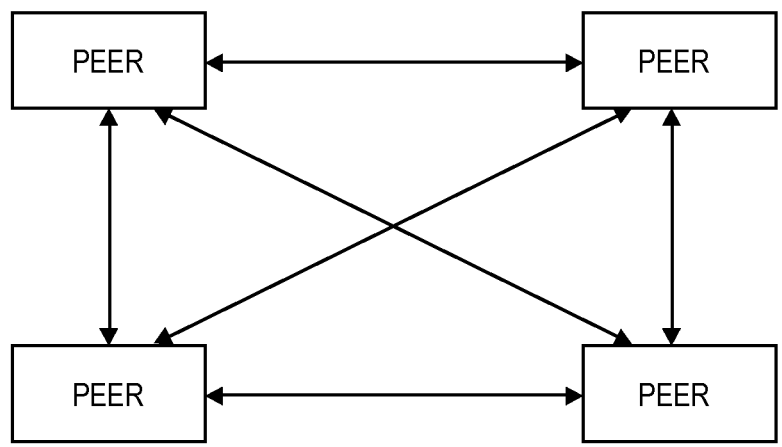
FIG. 2 illustrates a peer-to-peer network architecture.
Figure 3A:
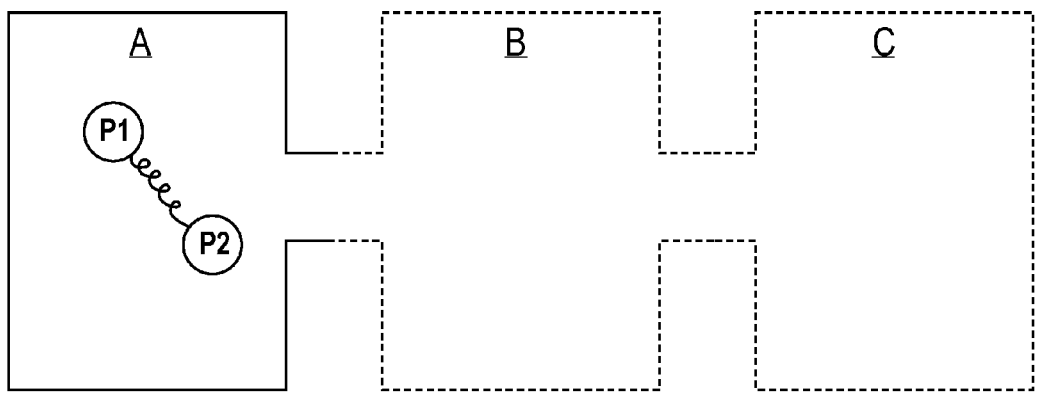
FIG. 3A illustrates tethered multiplayer system of the prior art.
Figure 3B:
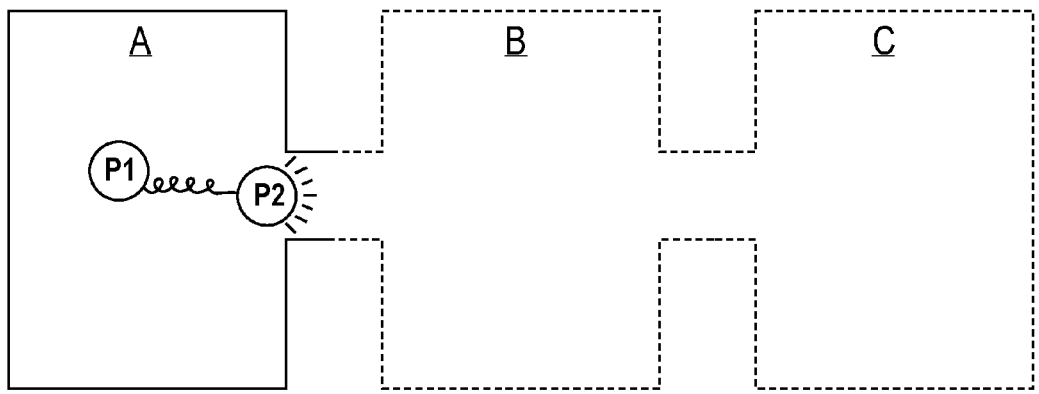
FIG. 3B illustrates another view of the tethered multiplayer system of FIG. 2A.

The figures will now be used to illustrate different embodiments in accordance with the invention. The figures are specific examples of embodiments and should not be interpreted as limiting embodiments, but rather exemplary forms and procedures.

DETAILED DESCRIPTION

Generally, methods and systems are described for operating a multiplayer video game on a peer-to-peer network in which game consoles can pass off or accept server or other management responsibilities for individual rooms or other virtual areas from other game consoles. The management responsibilities include such 'server' activities as keeping track of the state of the room, spawning and directing AI's (game artificial intelligent creatures), and otherwise managing the room for other consoles which are connected.

While the term "room" is used throughout the application for purposes of explanation, it should be understood that any appropriate level, area, section, partition, or other virtual area of a game or other such electronic presentation can be used as well within the scope of the various embodiments.

In an embodiment, a method can include managing a multiplayer video game on game consoles, personal computers, or other machines connected in a peer-to-peer network architecture. Any type of computing devices can be networked together for the game, such as personal computers, game consoles, handheld digital assistants, cellular phones, dedicated handheld game devices, and other electronic game devices.

The method can include managing on a first game console a room, cavern, level, arena, plateau, chamber, court, airspace, or other virtual area in the video game. Managing can include acting as a 'server' for a particular room, such as spawning and directing AI's, tracking items within the room (including the players themselves), and other game server-like functions.

A 'server' in the this context is to be distinguished from a 'server' in a client-server context. A server in a client-server context generally relates to how packets and lower level communications are routed and controlled and does not change as the game progresses, while a server for a room, level, or other virtual area generally relates to game server-like functions, such as tracking the location of each movable object in its respective virtual area. The latter server is for convenience called a 'level server.'

The level server can manage the virtual area for itself and other game consoles that are connected. For example, the level server can spawn an AI and direct the AI to attack one of the players. The AI's movements, including the pseudo-random, complex game artificial intelligence algorithms that simulate true artificial intelligence, are seeded or otherwise generated by the level server. The level server can handle animations and other features of the game.

A game console of a player in a level that is not the level server is, for convenience, sometimes called a 'level client.' This use of the word, 'client,' is to be distinguished from the term 'client' in client-server terminology likewise to the differentiation between the 'server' terms.

Management of the virtual area can be transferred for the virtual area from one game machine to another. This differs from a centralized server architecture where a single server handles animations, spawns AI's, etc. for the entire game world. Centralized servers of the prior art are not able to distribute the responsibilities of a server across all players in a game on a per-level basis.

Automatically transferring management can be in response to one or more of the players who are on the level server that are walking, running, swimming, jumping, flying, teleporting or otherwise moving their avatar or other user-controllable element corresponding to their game machine out of the virtual area into another virtual area. Moving from one virtual area to another can involve moving along a corridor, tunnel, escalator, elevator, bridge, or other pathway. There can be a challenge to conquer, such as defeating a foe or solving a puzzle before continuing to another room or level. No longer acting as the level server of a virtual area can open up memory space, communications bandwidth, and processor cycles for serving the other level.

Transferring management can also be in response to other factors, such as a degradation in communications with the level clients, taking on an another processing load unrelated to the game, or simply for a round-robin system in which each game console shares level server duties according to a predetermined time schedule.

Figure 4:
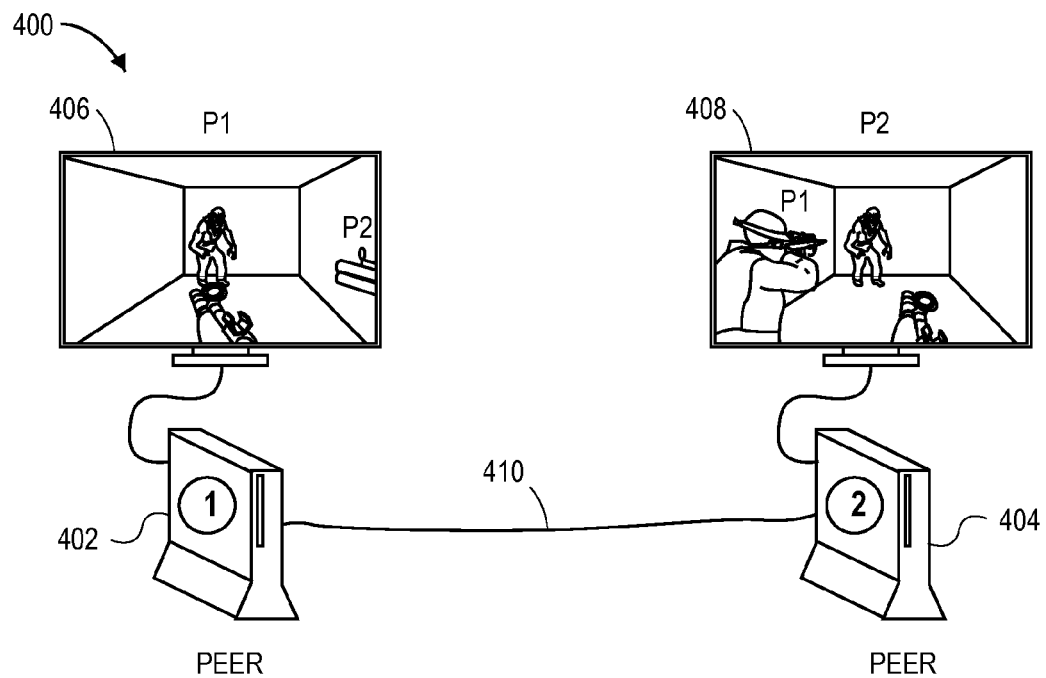
FIG. 4 illustrates peer-to-peer networked video game consoles in accordance with an embodiment.

FIG. 4 illustrates peer-to-peer networked video game consoles and their respective displays. Peer-to-peer system 400 includes player P1 game console 402 with P1 display 406, player P2 game console 404 with P2 display 408, and wire connection 410 between the game consoles. As shown on the displays, players P1 and P2 are in the same room.

Game console 402 acts as the level server, and game console 404 is the level client. Game console 402 thus manages the room, tracking the movable objects within the room for both consoles. Game console 402 spawns enemies and directs them to attack the two players. Game console 404 accepts the position of the enemies and follows the action as it occurs on game console 402.

Figure 5:
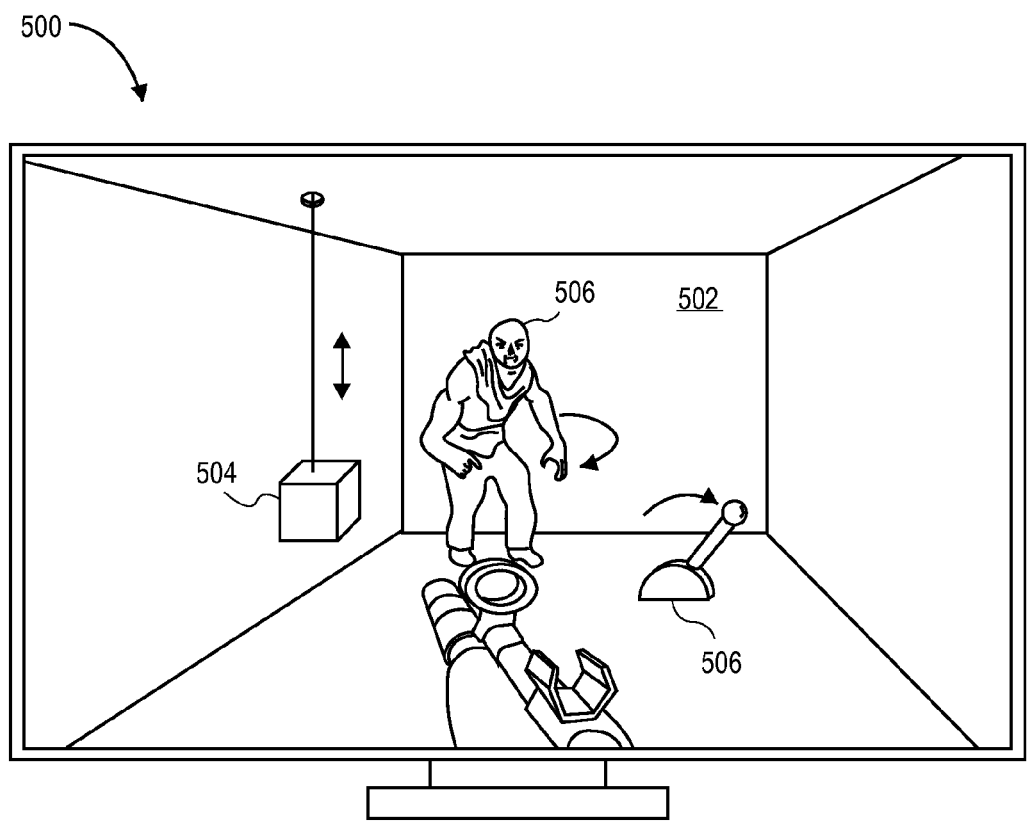
FIG. 5 illustrates a video game display with items in various positions and with different settings in accordance with an embodiment.

FIG. 5 illustrates a video game display with items in various positions and with different settings in a virtual area.

Virtual area 502 has movable box 504 which can move up or down in response to a pulley system (not shown). Non-player character 506, which can be friendly, neutral, or hostile to the players, is also shown. Lever 506, which can shift positions if a player walks up to it and depresses a button, is also shown. The level server tracks the positions of the various movable objects in the room and/or settings for the objects. For example, various positions and settings for the box, non-player character, and lever are shown in Table 1.

TABLE 1

| Item | Setting |
| --- | --- |
| Box | position.z = 0.1865233 |
| Non-player character | spawned = true |
| | position.x = 10.536641 |
| | position.y = −3.4277712 |
| | position.z = 0.0000000 |
| | leftelbow.angle = . . . |
| | . |
| | . |
| | . |
| | velocity.x = 0.2113988 |
| | . |
| | . |
| | . |
| | weapon = false |
| Lever | pulled = true |

The tracked information can be kept by the level server until needed by a level client, or the information can be disseminated at regular intervals to the level clients.

In the exemplary embodiment, when a player walks up to the lever and depresses a gamepad button, a signal is sent to the level server to toggle the lever. The level server can determine whether the user has performed prerequisites to move the lever, such as moving other levers in other rooms, obtaining a key to unlock the lever, or acquiring strength. Once the level server has determined that the player can move the lever, the lever is animated such that it moves from one position to another. The animation can be handled by the level server, or the level server can direct the level client to perform the final rendered animation such that the lever appears to move on the player's display. Other players who are in the room, if they are looking in the direction of the lever, can also see the lever move if their consoles, level clients, receive the animation from the level server. If two players attempt to handle the lever, one trying to move it and the other trying to hold it in position, the level server can mediate whether the lever moves. For example, the first player to the lever according to the level server can be determined to be the player who ultimately commands the lever.

Management of a room or other virtual area by a level server can take various forms and is not limited to the exemplary embodiments. Management can include simple tracking of objects and mediating disputes between level clients. Management can extend to broadcasting complex animations, directing AI's throughout the level, and managing the life cycle and network IDs of spawned objects.

Figure 6A:
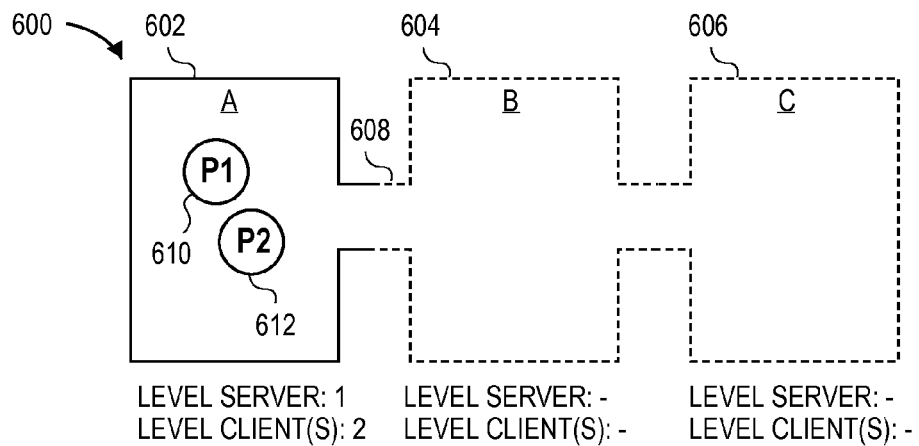
FIG. 6A illustrates a multiplayer game using a level server and level client in accordance with an embodiment.
Figure 6B:
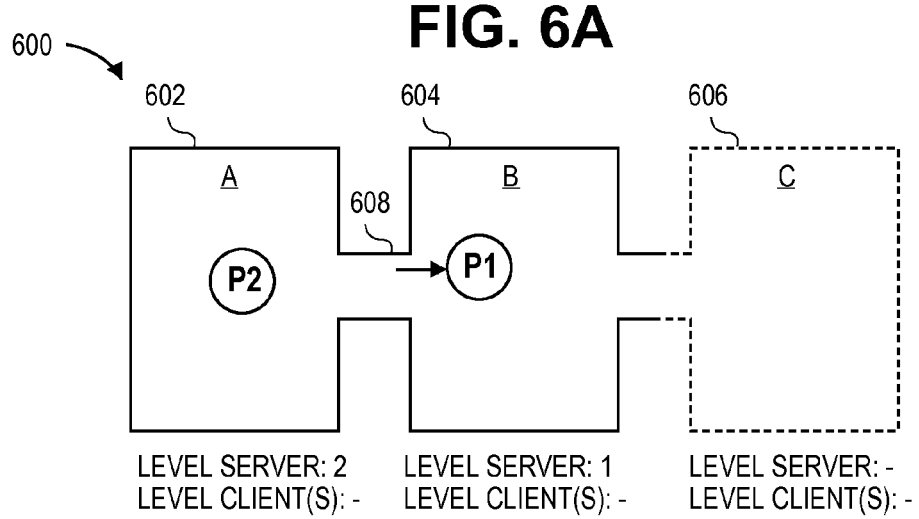
FIG. 6B illustrates a subsequent view of the multiplayer game of FIG. 6A.
Figure 6C:
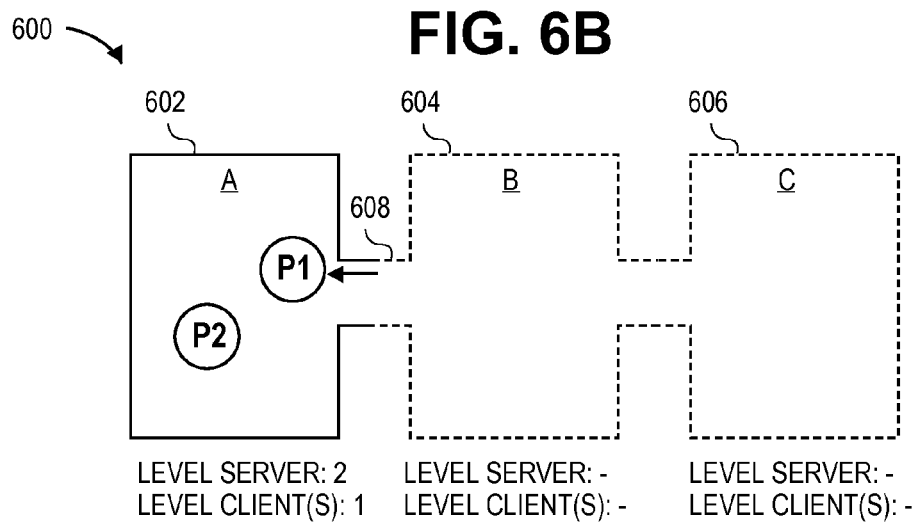
FIG. 6C illustrates a subsequent view of the multiplayer game of FIG. 6B.

FIGS. 6A-6C illustrate a multiplayer game using a level server and level client. Three rooms, or levels, are shown. Solid lines indicate rooms that are loaded in one of the console's memories, and dashed lines indicate rooms that are not loaded in any consoles memories. Room 602, is herein referred to as level A, room 604 is referred to as level B, and room 606 is referred to as level C. The levels are connected by corridors, such as corridor 608. Player 610 is referred to as player P1, and player 612 is referred to as player P2. In this embodiment, each peer-to-peer connected console can hold only one room in memory.

By having players move through a corridor to each level, the game system allows a transition time for level server transitions, loading and unloading of levels, and a slight break for the player to ready him or herself for the next level.

Below each room in the figures is a key which indicates which game console machine is the level server and which machines are the level client. Each level can have its own level server and list of level clients. In this embodiment, there are two game consoles.

In FIG. 6A, players P1 and P2 both start out in level A. As the key for level A indicates, P1's console, console 1, acts as the level server for the level. Console 1, which can be console 402 (see FIG. 4), spawns and directs the non-player characters such as non-player character 506 (see FIG. 5), tracks the movable objects, and otherwise manages level A. Console 2, which can be console 404 (see FIG. 4), accepts the non-player characters spawned and directed by console 1. Console 2 does not manage level A but leaves the management, level server tasks to console 1.

In FIG. 6B, player P1 walks from level A to level B. In response to the player walking out of level A, server responsibilities for level A transfer from console 1 to console 2. Console 2 is now the level server for level A. There are no level clients in level A because player P1 has left the room.

As player P1 walks through corridor 608, console 1, upon which player P1 plays, loads the level 'WAD' (Where's All the Data dataset, such as bitmaps, sounds, and features) for level B. Console 1 becomes the level server for level B as indicated in the key. There are no level clients in level B because no other players besides player P1 are in level B. Likewise, there are no level clients in level A because no other players besides player P2 are in level A.

In FIG. 6C, player P1 walks back from level B to level A. Console 1 unloads level B and dutifully requests to manage level A. However, because level A is already managed by console 2, console 1's request to manage level A is refused or otherwise denied. Level A remains managed by console 2, and console 1 becomes a level client of level A.

Figure 7A:
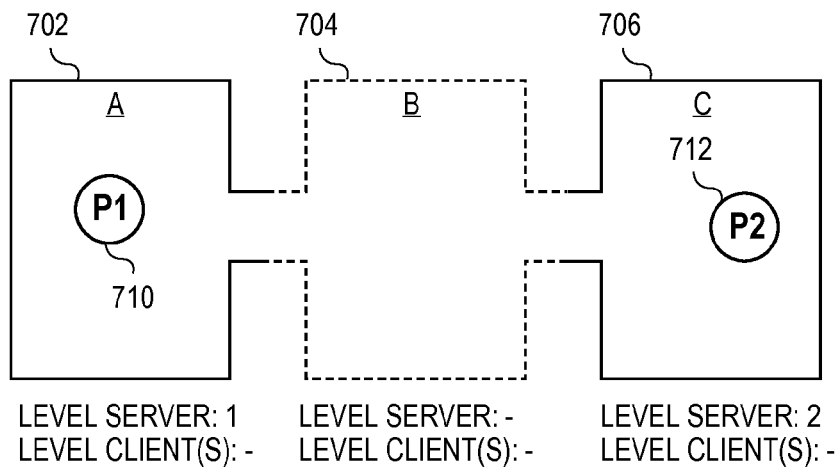
FIG. 7A illustrates a multiplayer game using a level server and level client in accordance with an embodiment.
Figure 7B:
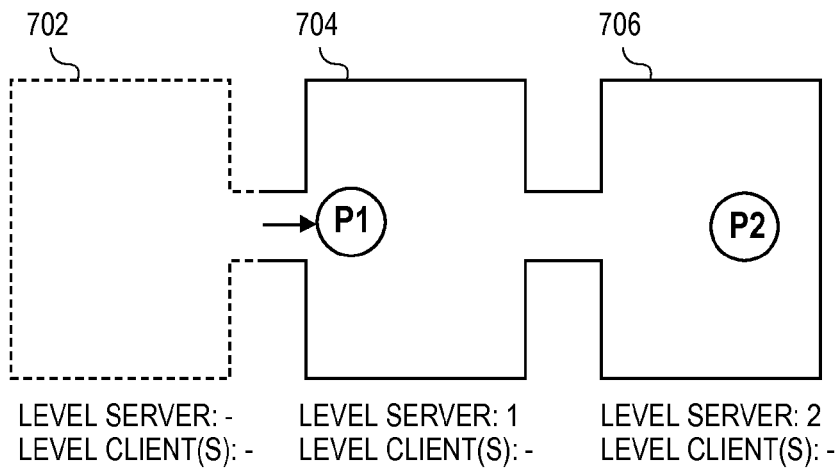
FIG. 7B illustrates a subsequent view of the multiplayer game of FIG. 7A.
Figure 7C:
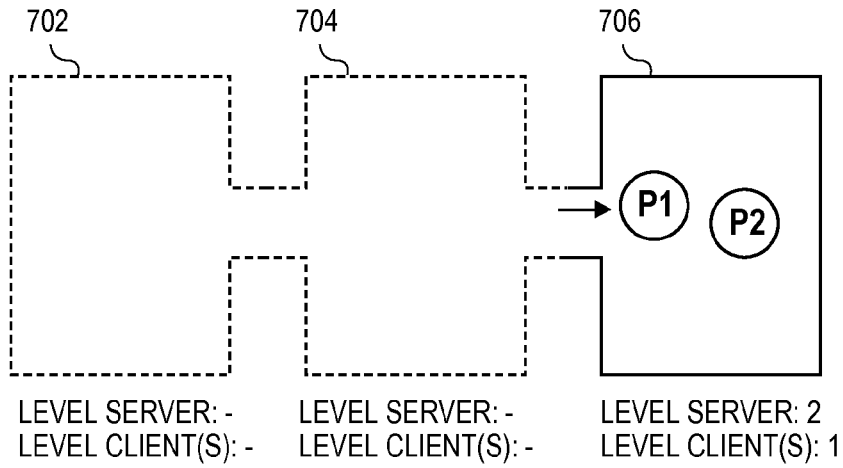
FIG. 7C illustrates a subsequent view of the multiplayer game of FIG. 7B.

FIGS. 7A-7C illustrate a situation of an embodiment in which the players start out in different rooms. Rooms 702, 704, and 706 are referred to as levels A, B, and C, respectively. Players 710 and 712 are referred to as players P1 and P2, respectively.

In FIG. 7A, player P1 starts out in level A, and player P2 starts out in level C. Console 1, upon which player P1 plays, is the level server of level A and thus manages level A. Console 2, upon which player P2 plays, is the level server of level B. Level B is not loaded on either console.

In FIG. 7B, player P1 leaves level A, unloading it from memory, and enters level B. Console 1 becomes the level server of level B and drops level server duties for level A.

In FIG. 7C, player P1 leaves level B, unloading it from memory, and enters level C. Console 1 attempts to become the level server of level C as it is entered by requesting to manage level C, but is denied the request to manage level C based on console 2 already managing level C. Thus, console 2 continues to manage level C, as it had in FIGS. 7A-7B, and console 1 becomes a level client of level C.

FIGS. 8A-8E illustrate a multiplayer game with separate diagrams for each console. The separate diagrams show which rooms are loaded (i.e. solid line) on the respective console indicated to the left and which rooms are not loaded (i.e. dashed lines) on the console. In this embodiment, each peer-to-peer connected console can hold two rooms in memory at the same time.

Rooms 802, 804, and 806 are referred to as levels A, B, and C, respectively. Players 810 and 812 are referred to as players P1 and P2, respectively.

Figure 8A:
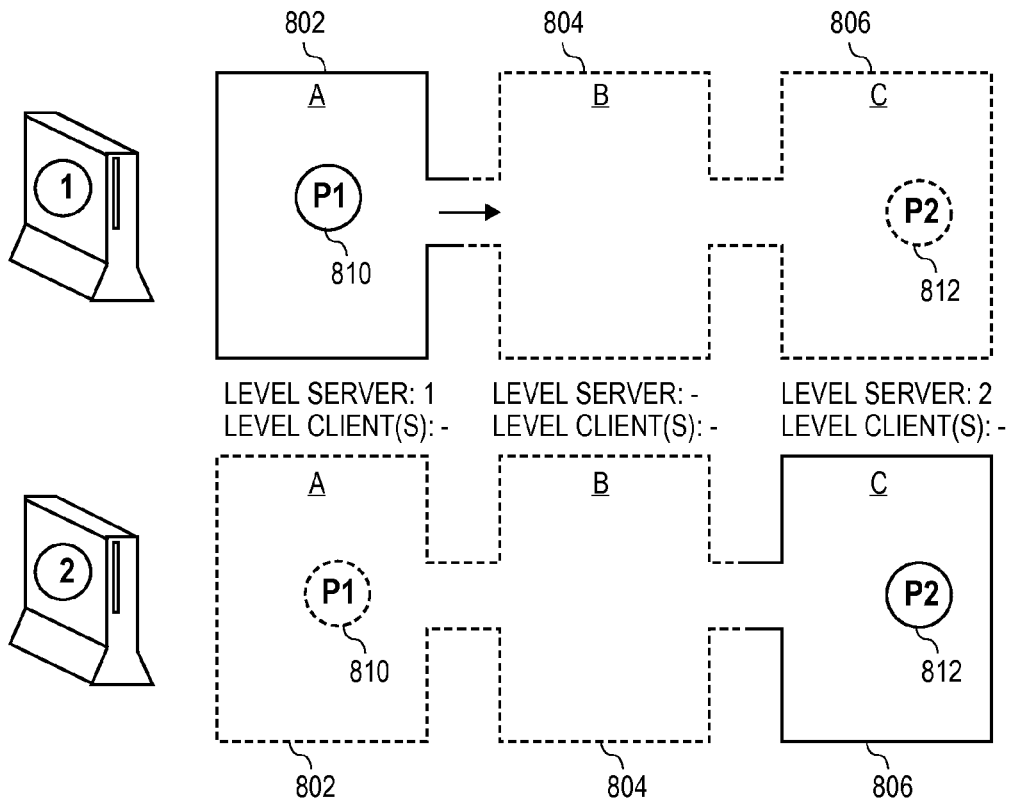
FIG. 8A illustrates a multiplayer game using a level server and level client in accordance with an embodiment.

In FIG. 8A, players P1 and P2 begin at opposite ends of the map, in levels A and C, respectively. Level A is loaded on console 1, which also manages level A as the respective level server. Level C is loaded on console 2, which also manages level C as the respective level server. In the upper diagram of FIG. 8A, level A is shown in solid lines as it is loaded on console 1, and levels B and C are shown in dashed lines as they are not loaded on console 1. In the lower diagram of FIG. 8A, level C is shown in solid lines as it is loaded on console 2, and levels A and B are shown in dashed lines as they are not loaded on console 2.

Figure 8B:
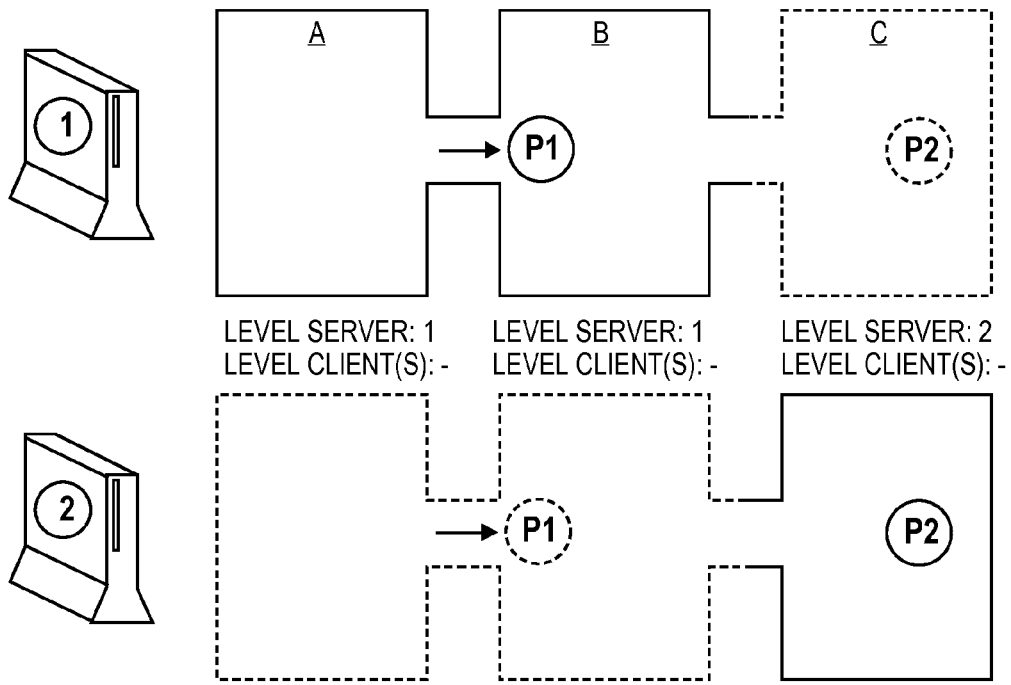
FIG. 8B illustrates a subsequent view of the multiplayer game of FIG. 8A.

In FIG. 8B, player P1 moves from level A into level B. Console 1 requests to manage level B, and the request is granted from the host because level B does not already have a managing console. Console 1 can keep up to two levels in memory and act as level servers for two levels, so console 1 keeps level A in memory and retains its level server role there as indicated in the keys.

Figure 8C:
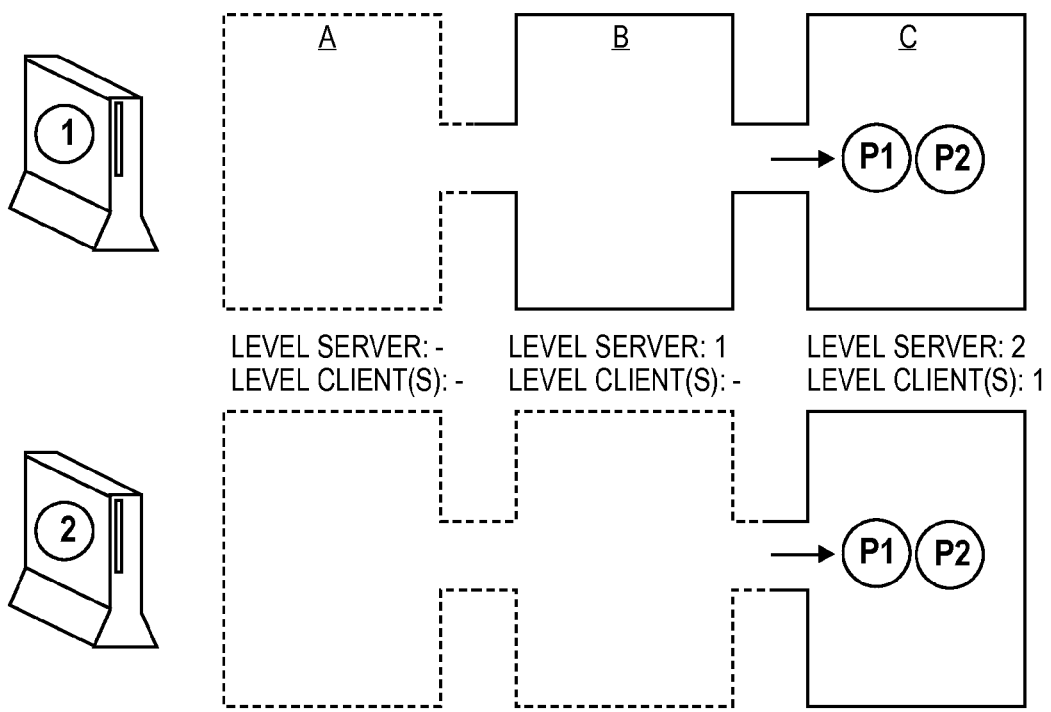
FIG. 8C illustrates a subsequent view of the multiplayer game of FIG. 8B.

In FIG. 8C, player P1 moves from level B into level C. Console 1 requests to manage level C, but the request is denied from the host because level C already has a managing console, console 2. Console 1 can only have two levels loaded in memory, so it unloads level A before loading level C. Console 1 submits to being a level client on level C. Console 1, however, remains as the manager of level B. Console 2, upon which player P2 plays, remains level server of level C.

Figure 8D:
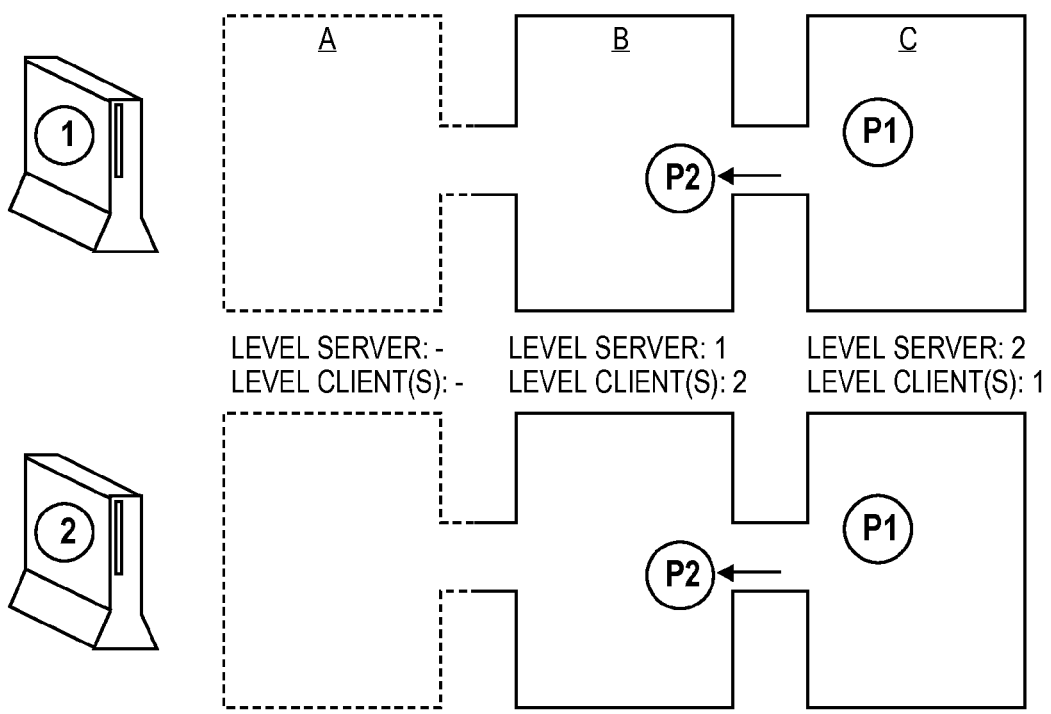
FIG. 8D illustrates a subsequent view of the multiplayer game of FIG. 8C.

In FIG. 8D, player P2 moves from level C to level B. Console 2 requests to become level server of level B, and the request is denied because console 1 is already the level server of level B. Console 2, however, remains level server of level C. As a result of the previous player movements, the player's consoles manage the rooms that the other players are in but not the rooms that their player is in.

Figure 8E:
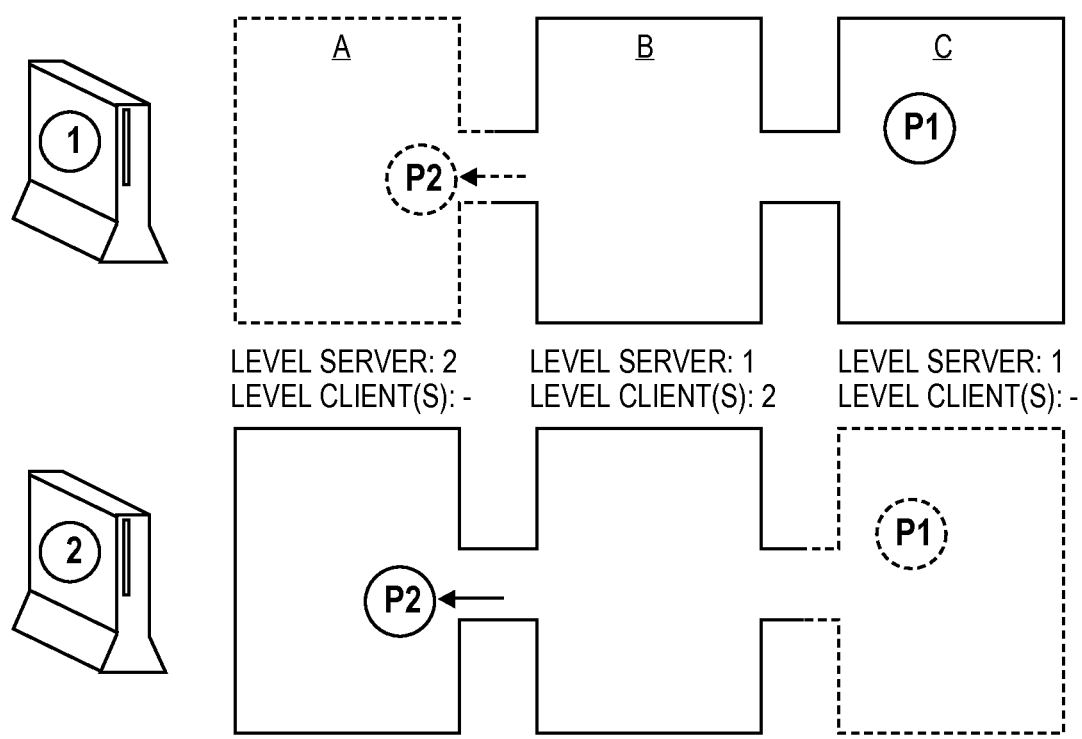
FIG. 8E illustrates a subsequent view of the multiplayer game of FIG. 8D.

In FIG. 8E, player P2 moves from level B to level A. Console 2 requests to become the level server of level A and is granted the request because level A has no current level server. Console 1 remains level server of level C. Meanwhile, level B is still managed by console 2 with console 1 as the sole level client.

Other players can be involved in the various rooms, each respective game console requesting to become level server as a room is entered or as it is loaded. If the room does not already have a level server, then the request is granted. If the room already has a level server, then the request is denied and the player's game console becomes a level client.

Alternative arrangements for determining which console is the level server and which consoles are the level clients can include making the console with the best connection, the fastest speed, or the most memory the level server.

In a preferred embodiment, the host player's console determines which console is the level server for all levels. The 'host player' is the first player to start the game, with which other players join in as guests. If the host player drops out, then the second player to start the game becomes the host player, and so on.

Figure 9:
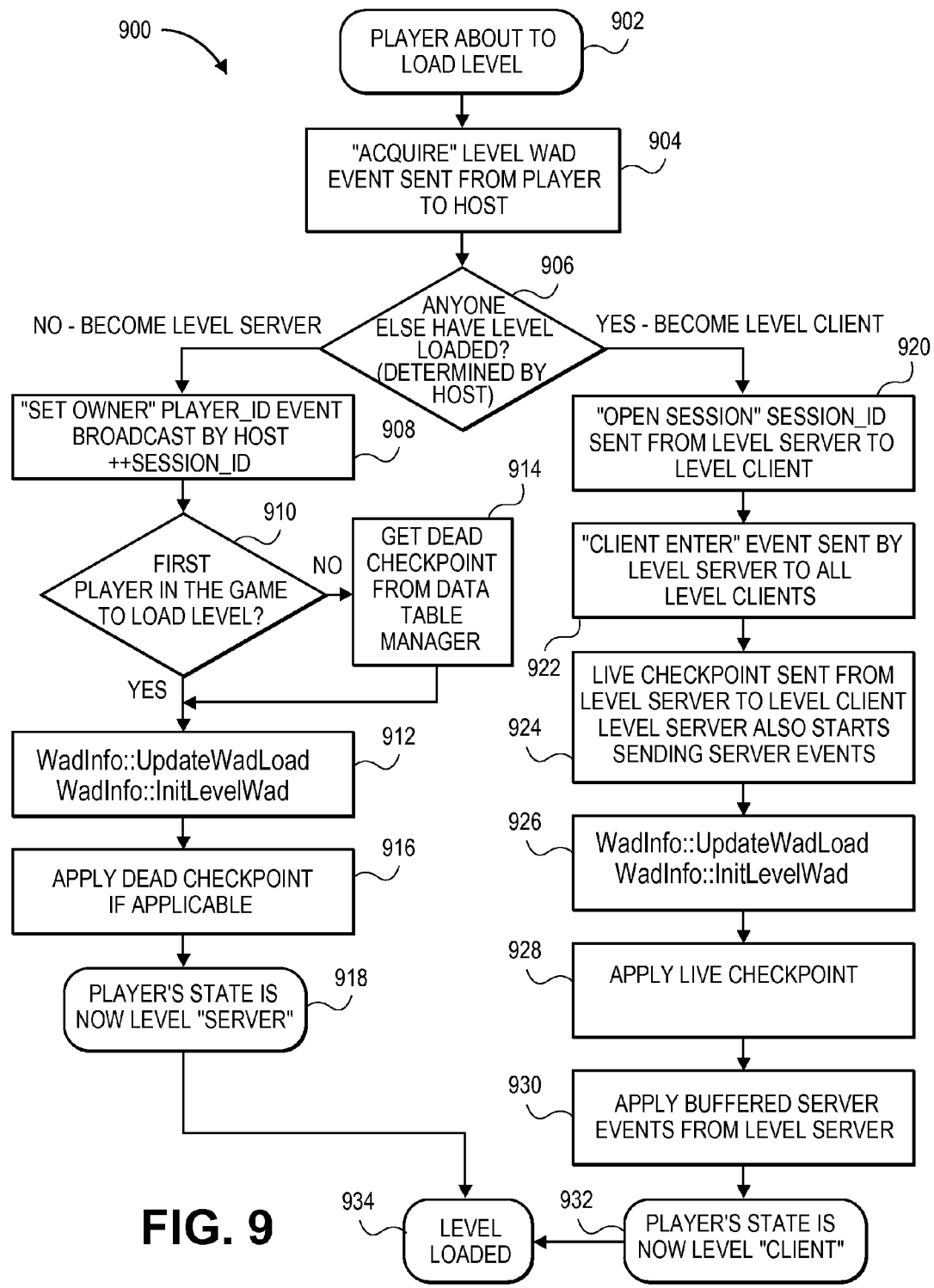
FIG. 9 is a flowchart of a player's game console loading a level in accordance with an embodiment.

FIG. 9 is a flowchart of method in accordance with an embodiment of when a player's game console loads a level WAD. This may be, but is not always, triggered by the player entering a room. In this embodiment, each room corresponds to one level WAD, which should be loaded into memory before the player may enter the room.

Process 900 begins with a player about to load a level in step 902. In step 904, an "acquire" event for a level WAD is sent from the player's console to the host. The acquire event is a request to manage the room.

In step 906, the host determines whether any other player's game console has the level WAD loaded. If the answer is no, that no one else has the level loaded, then the flow proceeds to step 908. If the answer is yes, that someone else has the level loaded, then the flow proceeds to step 920.

In step 908, a "set owner" event with a player_id is broadcast by the host console to all the consoles. If the player is not the first player of the game to load the level, as determined in step 910, then the player's console gets a "dead checkpoint" from a Data Table Manager in step 914. Otherwise, flow continues to step 912 in which the level WAD is loaded and initialized. In step 916, the dead checkpoint is applied if it was acquired in step 914. At step 918, the player's console state is now the level "server," and the level is considered loaded (in step 934). Simulation can now commence in that level.

In step 920 (i.e. there is already a level server), an "open session" event with a session_id is sent from the current level server to the player's console. In step 922, an "client enter" event is sent by the level server to all existing clients. In step 924, a live checkpoint is sent from the level server to the player's console, and the level server begins sending server events to the player's console. In step 926, the level WAD is loaded and initialized on the player's console. In step 928, the live checkpoint acquired in step 924 is applied, and in step 930, buffered server events from the level server are also applied. At step 932, the player's console state is now level "client," and the level is considered loaded (in step 934).

Figure 10:
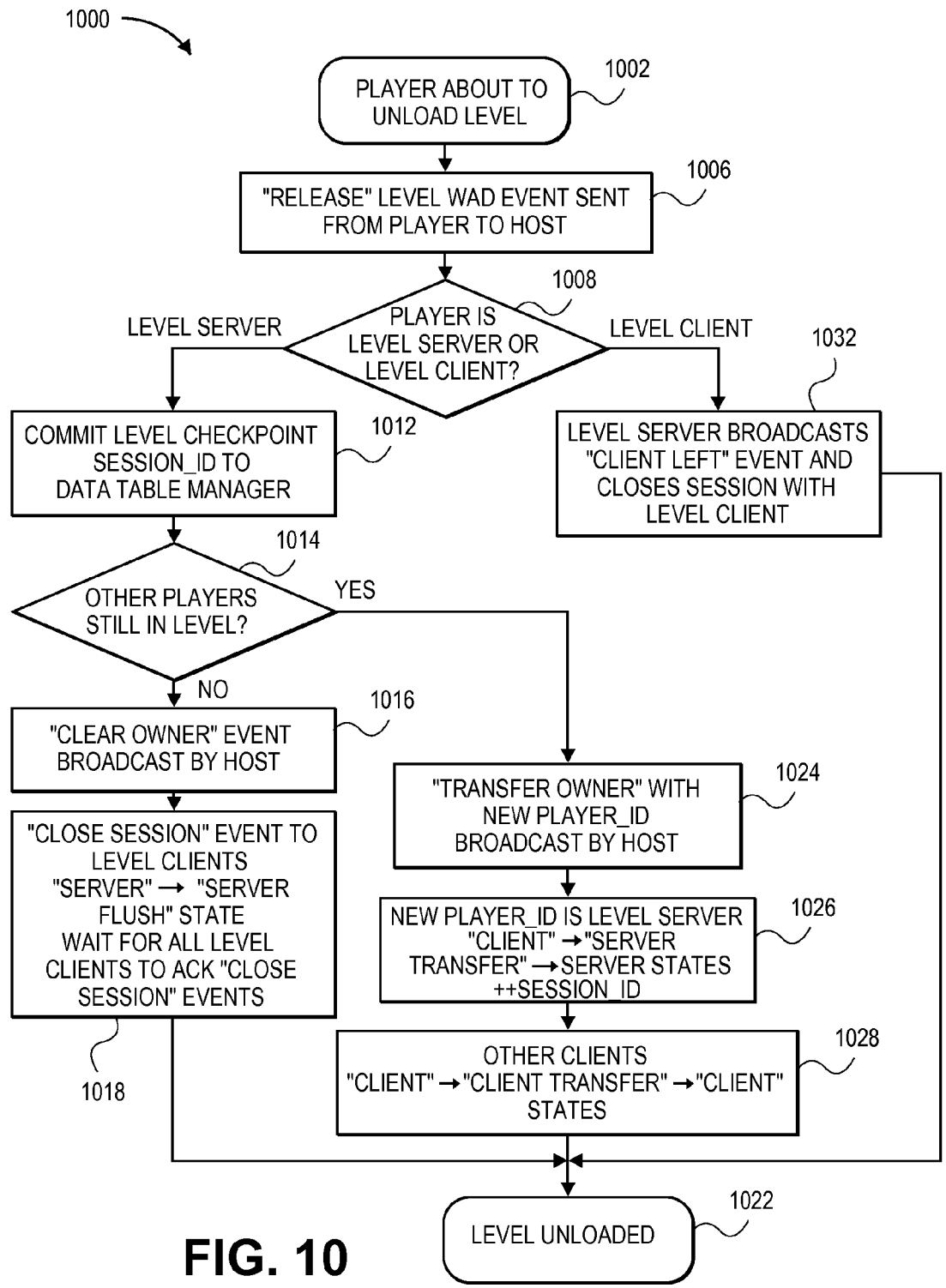
FIG. 10 is a flowchart of a player's game console unloading a level in accordance with an embodiment.

FIG. 10 is a flowchart of a method in accordance with an embodiment of when a player's machine unloads a level. This may be, but is not always, triggered by the player exiting a room. In this embodiment, as in the previous embodiment, each room corresponds to one level WAD, which should be loaded into memory before the player may enter the room. Conversely, when a player exits a room, some mechanism (e.g. garbage collection) may decide that it is necessary to unload the level WAD after the player exits the room. It is possible to exit a room and still retain the level WAD for that room in memory.

Process 1000 begins with a player about to unload a level in step 1002. A determination may have been made to unload the level because another level is to be loaded and there is not enough room in memory for both levels to be loaded. The level may need to be unloaded for processor constraints, connection problems, or because of periodic garbage collection for memory related to unused levels.

In step 1006, a "release" (level WAD) event is sent from the player's console to the host. Whether the player's console is a level server, which manages the level, or a level client is determined from its current status in step 1008. If the player's console is a level server, then the process moves to step 1012. Otherwise, the process moves to step 1032.

In step 1012, a level checkpoint with the current session_id for the level is committed to the Data Table Manager. A level checkpoint is the per-level save game information which would normally be written out in a single player game (i.e., the 'save game' of the level). A checkpoint can include the complete state required to restore a level to an identical previous state.

Whether other players are in the level with the player is determined in step 1014. If there are no other players in the level, then the process proceeds to step 1016. Otherwise, the process moves to step 1024.

In step 1016, a "clear owner" event is broadcast by the host for the level. In step 1018, a "close session" event is sent to the level clients of the room by the player's console, and its state transitions from "server" to "server flush." There can be other level clients of a room even though no other players are in the level (see, e.g., FIG. 8E). After all the level clients have acknowledged the close session events, then the player's console ends up with the level unloaded in step 1022.

In step 1024 (i.e. other players are still in the room), a "transfer owner" with a new player_id is broadcast by the host. In step 1026, the new player_id is the console that will become the new level server, and this console transitions its state from "client" to "server transfer" to "server." In step 1028, the other consoles (i.e. the consoles that are not identified by the player_id broadcast by the host) transition their states from "client" of the old level server to "client transfer" and back to "client" of the new level server. In step 1022, the player's console ends up with the level unloaded.

In step 1032 (i.e. the player was a level client in the level), the level server broadcasts a "client left" event to the other level clients of the level and closes its session with the player's console. After this release, the player's console has the level unloaded in step 1022.

FIG. 11 illustrates a data table manager in accordance with an embodiment. A copy of the table is broadcast among all players' consoles when a new checkpoint version is committed to the table. If a player unloads a level (by perhaps leaving a room as in FIG. 6B), then the other players synchronize their checkpoints of the level. For example, if player P1 leaves level C, then player P1's console updates the data table manager to the next version number for the level, in this case, "2." This is broadcast to player P2 and P3's game consoles, which quickly determine that their version numbers for level C are less than that for player P1. Thus, player P2 and P3's consoles synchronize with the checkpoint left behind by P1.

FIG. 12 illustrates a level token table in accordance with an embodiment. This table tracks the "current owner," or level server, of each level (such as a room), along with which players have the level loaded in memory. In this case, player P3's console is the level server and manages level C for players P1, P2, and P3. Player P4's console manages level D all by itself for player D alone.

Figure 13:
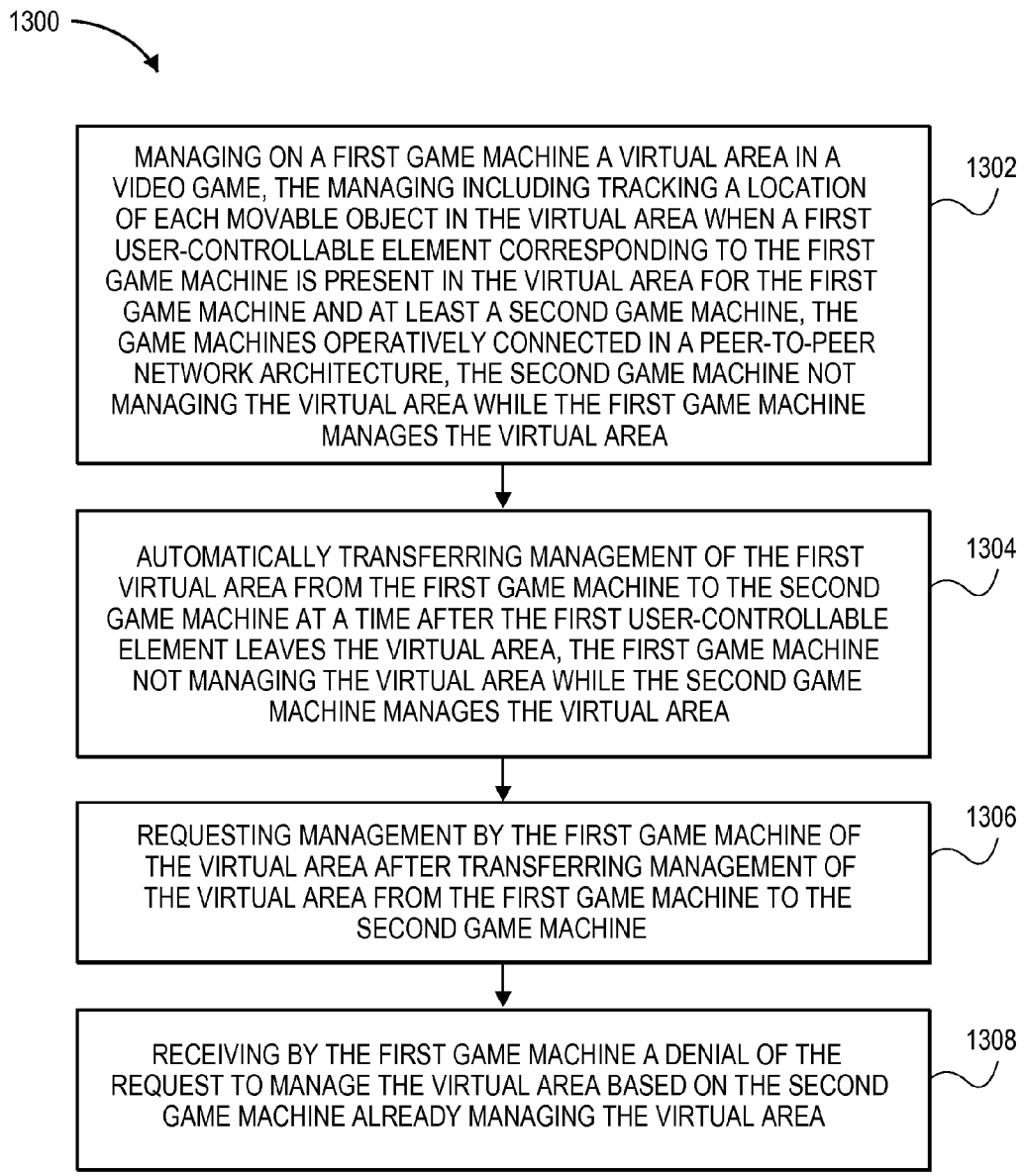
FIG. 13 is a flowchart illustrating an embodiment in accordance with an embodiment.

FIG. 13 shows an example flowchart illustrating process 1300 in accordance with one embodiment. This process can be automated in a computer or other machine. The process can be coded in software, firmware, or hard coded as machine-readable instructions and run through one or more processors that can implement the instructions. In operation 1302, a first virtual area in a video game is managed on a first game machine. Managing includes tracking a location of each movable object in the virtual area for the first game machine and a second game machine, the game machines connected through wired, wireless, or other means such that they are operatively connected in a peer-to-peer network architecture. The second game machine does not manage the virtual area while the first game machine manages the virtual area. The second game machine is a level client of the virtual area. In operation 1304, management of the first virtual area is transferred from the first game machine to the second game machine, the first game machine not managing the virtual area while the second game machine manages the virtual area.

In operation 1306, management is requested by the first game machine of the virtual area after transferring management of the virtual area from the first game machine to the second game machine. In operation 1308, a denial of the request to manage the virtual area in operation 1306 is received by the first game machine based on the second game machine already managing the virtual area. These operations may be performed in the sequence given above or in different orders as applicable.

Figure 14:
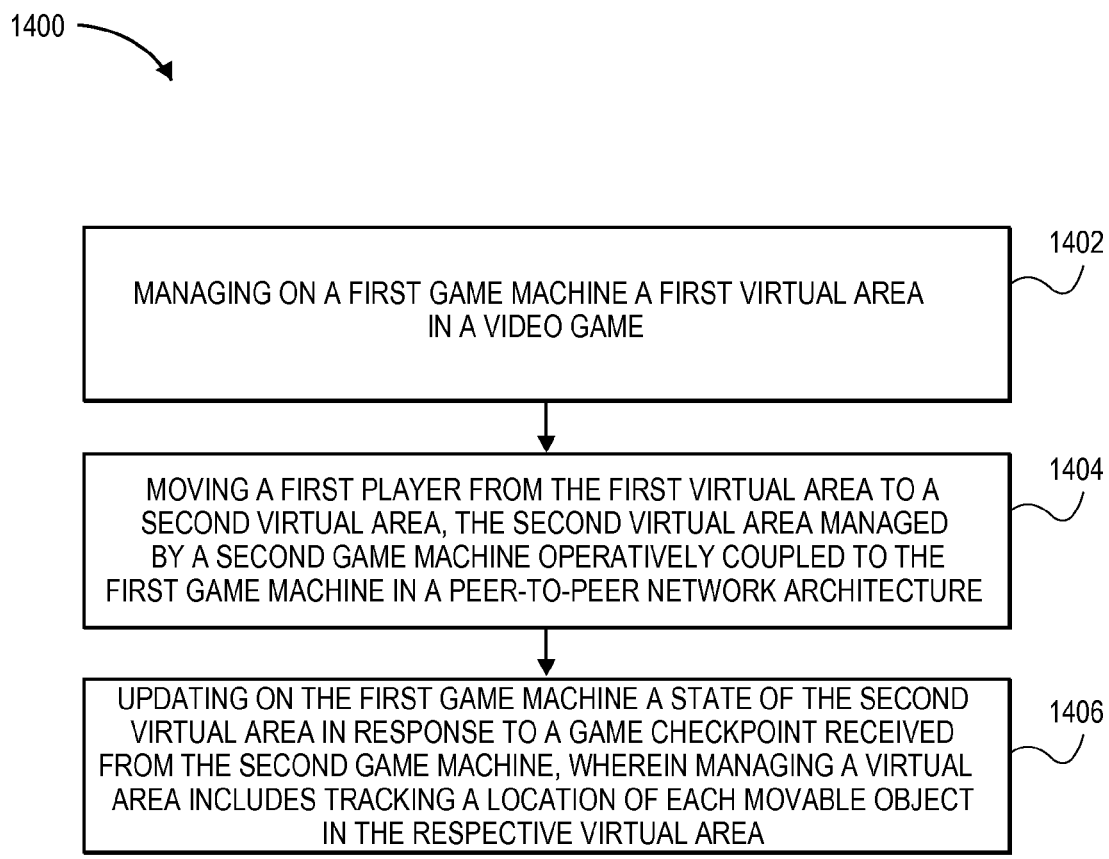
FIG. 14 is a flowchart illustrating an embodiment in accordance with an embodiment.

FIG. 14 shows an example flowchart illustrating process 1400 in accordance with one embodiment. As with the process in the previous figure, this process can be automated in a computer or other machine. The process can be coded in software, firmware, or hard coded as machine-readable instructions and run through one or more processors that can implement the instructions. In operation 1402, a first virtual area in a video game is managed on a first game machine. In operation 1404, a first player is moved from the first virtual area to a second virtual area, the second virtual area managed by a second game machine operatively coupled to the first game machine in a peer-to-peer network architecture. In operation 1406, a state of the second virtual area is updated on the first game machine in response to a game checkpoint received from the second game machine. Managing a virtual area includes tracking a location of each movable object in the respective virtual area.

Figure 15:
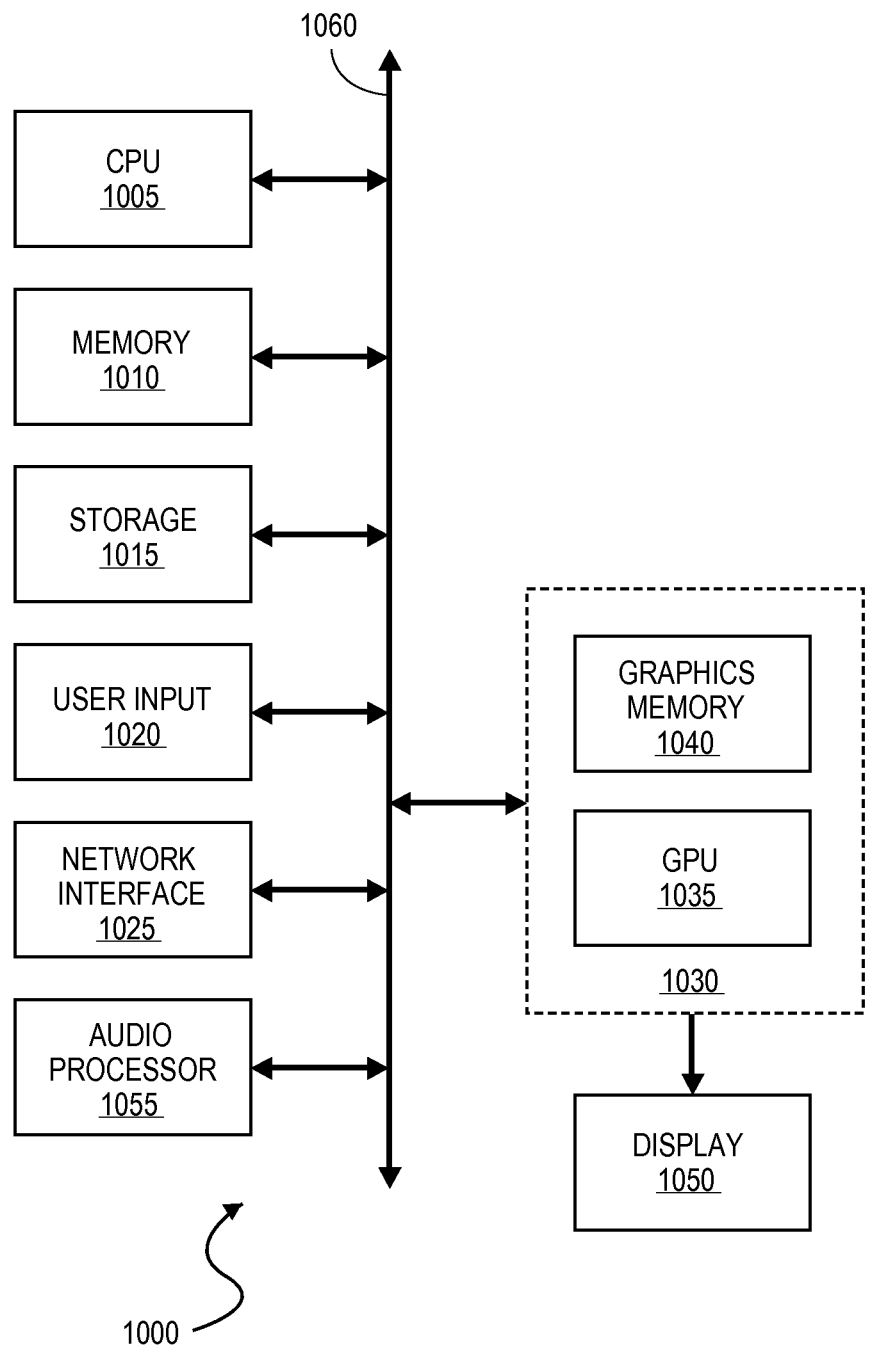
FIG. 15 illustrates an example computer system suitable for use with embodiments of the invention.

FIG. 15 illustrates an example computer system suitable for use with embodiments of the invention. The figure is a block diagram of a computer system 1000, such as a personal computer, video game console, personal digital assistant, or other digital device, suitable for practicing an embodiment of the invention. Computer system 1000 includes a central processing unit (CPU) 1005 for running software applications and optionally an operating system. CPU 1005 may be comprised of one or more homogeneous or heterogeneous processing cores. Memory 1010 stores applications and data for use by the CPU 1005. Storage 1015 provides non-volatile storage for applications and data and may include fixed disk drives, removable disk drives, flash memory devices, and CD-ROM, DVD-ROM, Blu-ray, HD-DVD, or other optical storage devices. User input devices 1020 communicate user inputs from one or more users to the computer system 1000, examples of which may include keyboards, mice, joysticks, touch pads, touch screens, still or video cameras, and/or microphones. Network interface 1025 allows computer system 1000 to communicate with other computer systems via an electronic communications network, and may include wired or wireless communication over local area networks and wide area networks such as the Internet. An audio processor 1055 is adapted to generate analog or digital audio output from instructions and/or data provided by the CPU 1005, memory 1010, and/or storage 1015. The components of computer system 1000, including CPU 1005, memory 1010, data storage 1015, user input devices 1020, network interface 1025, and audio processor 1055 are connected via one or more data buses 1060.

A graphics subsystem 1030 is further connected with data bus 1060 and the components of the computer system 1000. The graphics subsystem 1030 includes a graphics processing unit (GPU) 1035 and graphics memory 1040. Graphics memory 1040 includes a display memory (e.g., a frame buffer) used for storing pixel data for each pixel of an output image. Graphics memory 1040 can be integrated in the same device as GPU 1035, connected as a separate device with GPU 1035, and/or implemented within memory 1010. Pixel data can be provided to graphics memory 1040 directly from the CPU 1005. Alternatively, CPU 1005 provides the GPU 1035 with data and/or instructions defining the desired output images, from which the GPU 1035 generates the pixel data of one or more output images. The data and/or instructions defining the desired output images can be stored in memory 1010 and/or graphics memory 1040. In an embodiment, the GPU 1035 includes 3D rendering capabilities for generating pixel data for output images from instructions and data defining the geometry, lighting, shading, texturing, motion, and/or camera parameters for a scene. The GPU 1035 can further include one or more programmable execution units capable of executing shader programs.

The graphics subsystem 1030 periodically outputs pixel data for an image from graphics memory 1040 to be displayed on display device 1050. Display device 1050 is any device capable of displaying visual information in response to a signal from the computer system 1000, including CRT, LCD, plasma, and OLED displays. Computer system 1000 can provide the display device 1050 with an analog or digital signal.

In embodiments of the invention, CPU 1005 is one or more general-purpose microprocessors having one or more processing cores. Further embodiments of the invention can be implemented using one or more CPUs with microprocessor architectures specifically adapted for highly parallel and computationally intensive applications, such as media and interactive entertainment applications.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of managing a multiplayer video game on game machines connected in a peer-to-peer network architecture, the method comprising:

detecting, by a first game machine having a display device, that a user-controllable element is electronically rendered by the display device within a first virtual area of a plurality of virtual areas of a video game, the video game being associated with the first game machine and a second game machine, wherein each of the plurality of virtual areas are electronically rendered by the display device, and wherein the first game machine and the second game machine are operatively connected in a peer-to-peer network;

based on detecting that the user-controllable element is electronically rendered within the first virtual area, tracking, by a first game machine, display coordinates corresponding to a location of each movable object of a plurality of movable objects that are rendered for the video game by the display device of the first game machine, each movable object of the plurality of movable objects being electronically rendered in the first virtual area of the plurality of virtual areas for the video game, wherein the second game machine does not track the location of each movable object of the plurality of movable objects that are electronically rendered in the first virtual area while the first game machine tracks the display coordinates corresponding to the location of each movable object of the plurality of movable objects that are electronically rendered in the first virtual area;

responsive to identifying that the user-controllable element has transferred from the first virtual area to a second virtual area of the plurality of virtual areas, automatically transferring, by the first game machine, the tracking of the display coordinates corresponding to the location of each movable object of the plurality of movable objects electronically rendered in the first virtual area from the first game machine to the second game machine; and unloading, from a memory of the first game machine, data stored based on the tracking of the display coordinates of the display coordinates corresponding to the location of each movable object of the plurality of movable objects that are electronically rendered in the first virtual area, wherein the unloading is based on the transferring.

2. The method of claim 1 further comprising:
based on the tracking the display coordinates corresponding to the location of each movable object of a plurality of movable objects that are rendered for the video game by the display device of the first game machine, identifying, by the first game machine, that the user-controllable element has transferred from the first virtual area to the second virtual area of the plurality of virtual areas, wherein the user controllable-element transferring from the first virtual area to the second virtual area corresponds to a player provided by the first game machine moving away from the first virtual area.

3. The method of claim 1 wherein the transferring from the first game machine to the second game machine is further responsive to the first game machine unloading the first virtual area, thereby freeing resources in the first game machine for other virtual areas of the plurality of virtual areas.

4. The method of claim 1 further comprising:
after the transferring, requesting tracking the location of each movable object of the plurality of movable objects in the first virtual area at the first game machine; and
receiving by the first game machine a message indicating denial of the request for tracking the location of each movable object of the plurality of movable objects in the first virtual area at the first game machine.

5. The method of claim 4 wherein the requesting occurs as a result of the user-controllable element moving from a third virtual area of the plurality of virtual areas back into the first virtual area.

6. The method of claim 4 wherein the request is sent to a host game machine of the video game, and wherein message indicating the denial is received from the host game machine of the video game, the host game machine being a game machine which started the video game.

7. The method of claim 4 wherein a movable object electronically rendered in the first virtual area is a spawned non-player character.

8. The method of claim 1 wherein managing a virtual area includes directing a movable object that is a non-player character, wherein the movable object is directed using game artificial intelligence (AI) in the virtual area.

9. The method of claim 8 wherein directing the movable object that is the non-player character includes spawning the non-player character and ordering the non-player character to attack.

10. The method of claim 8 wherein managing the virtual area includes sending a level checkpoint in response to a request by another machine to load the virtual area.

11. The method of claim 1 further comprising:
requesting the first game machine to manage the second virtual area; and
receiving a message indicating a denial of a request for the first game machine to manage the second virtual area, wherein the denial is based on determining that the second game machine is managing the second virtual area.

12. The method of claim 1 wherein a virtual area is includes a room, a cavern, a level, an arena, a plateau, or a combination thereof.

13. The method of claim 1 wherein the first virtual area and the second virtual area are connected by a corridor, a tunnel, a challenge, an elevator, or a bridge.

14. The method of claim 1 wherein movement of a user-controllable element in a virtual area includes crawling, walking, running, swimming, jumping, flying, teleporting, or a combination thereof.

15. The method of claim 1 further comprising:
broadcasting an event that the user-controllable element has left the first virtual area based on the user-controllable element leaving the first virtual area.

16. The method of claim 15 further comprising:
unloading the first virtual area from the first game machine based on garbage collection for the memory of the first game machine.

17. A machine-readable non-transitory storable medium embodying information indicative of instructions for causing one or more machines to perform operations, the operations comprising:
detecting, by a first game machine having a display device, that a user-controllable element is electronically rendered by the display device within a first virtual area of a plurality of virtual areas of a video game, the video game being associated with the first game machine and a second game machine, wherein each of the plurality of virtual areas are electronically rendered by the display device, and wherein the first game machine and the second game machine are operatively connected in a peer-to-peer network;

based on detecting that the user-controllable element is electronically rendered within the first virtual area, tracking, by a first game machine, display coordinates corresponding to a location of each movable object of a plurality of movable objects that are rendered for the video game by the display device in the first virtual area of the plurality of virtual areas for the video game, wherein the second game machine does not track the location of each movable object of the plurality of movable objects that are electronically rendered in the first virtual area while the first game machine tracks the display coordinates corresponding to the location of each movable object of the plurality of movable objects that are electronically rendered in the virtual area;

responsive to identifying that the user-controllable element has transferred from the first virtual area to a second virtual area of the plurality of virtual areas, automatically transferring, by the first game machine, the tracking of the display coordinates corresponding to the location of each movable object of the plurality of movable objects electronically rendered in the first virtual area from the first game machine to the second game machine; and unloading, from a memory of the first game machine, data stored based on the tracking of the display coordinates of the display coordinates corresponding to the location of each movable object of the plurality of movable objects that are electronically rendered in the first virtual area, wherein the unloading is based on the transferring.

18. A computer system executing instructions in a computer program, the instructions comprising program code to:

detect, by a first game machine having a display device, that a user-controllable element is electronically rendered by the display device within a first virtual area of a plurality of virtual areas of a video game, the video game being associated with the first game machine and a second game machine, wherein each of the plurality of virtual areas are electronically rendered by the display device, and wherein the first game machine and the second game machine are operatively connected in a peer-to-peer network;

based on detecting that the user-controllable element is electronically rendered within the first virtual area, track, by a first game machine, display coordinates corresponding to a location of each movable object of a plurality of movable objects that are rendered for the video game by the display device of the first game machine, each movable object of the plurality of movable objects being electronically rendered in the first virtual area of the plurality of virtual areas for the video game, wherein the second game machine does not track the location of each movable object of the plurality of movable objects that are electronically rendered in the first virtual area while the first game machine tracks the display coordinates corresponding to the location of each movable object of the plurality of movable objects that are electronically rendered in the first virtual area;

responsive to identifying that the user-controllable element has transferred from the first virtual area to a second virtual area of the plurality of virtual areas, automatically transfer, by the first game machine, the tracking of the display coordinates corresponding to the location of each movable object of the plurality of movable objects electronically rendered in the first virtual area from the first game machine to the second game machine; and unload, from a memory of the first game machine, data stored based on the tracking of the display coordinates of the display coordinates corresponding to the location of each movable object of the plurality of movable objects that are electronically rendered in the first virtual area, wherein the unloading is based on the transferring.

* * * * *